US012487618B2

(12) United States Patent
Shi

(10) Patent No.: US 12,487,618 B2
(45) Date of Patent: Dec. 2, 2025

(54) HYBRID LDO REGULATOR WITH FINE LOOP PRESET

(71) Applicant: NXP B.V., Eindhoven (NL)

(72) Inventor: Minwen Shi, Eindhoven (NL)

(73) Assignee: NXP B.V., Eindhoven (NL)

( * ) Notice: Subject to any disclaimer, the term of this patent is extended or adjusted under 35 U.S.C. 154(b) by 199 days.

(21) Appl. No.: 18/514,593

(22) Filed: Nov. 20, 2023

(65) Prior Publication Data

US 2025/0165019 A1 May 22, 2025

(51) Int. Cl.
*G05F 1/563* (2006.01)
*G05F 1/565* (2006.01)

(52) U.S. Cl.
CPC .............. *G05F 1/563* (2013.01); *G05F 1/565* (2013.01)

(58) Field of Classification Search
CPC ... G05F 1/59; G05F 1/56; G05F 1/563; G05F 1/565
See application file for complete search history.

(56) References Cited

U.S. PATENT DOCUMENTS 10,678,280 B2 6/2020 Cho et al.
2017/0212540 A1* 7/2017 Cho ..................... H03K 5/1534
2018/0226981 A1* 8/2018 Salem ................. H03M 1/0617
2022/0197321 A1* 6/2022 Tiagaraj .................. G05F 1/565

OTHER PUBLICATIONS

Chaubey, S., "Design Techniques for Zero Steady-State Output Ripple in Digital Low Dropout Regulators", 2019 IEEE 62nd International Midwest Symposium on Circuits and Systems (MWSCAS), DOI: 10.1109/MWSCAS.2019.8885068, Aug. 4-7, 2019.

De Carmine, A., A Current Efficient 10mA Analog-Assisted Digital Low Dropout Regulator with Dynamic Clock Frequency in 65nm CMOS, 2020 IEEE International Symposium on Circuits and Systems (ISCAS), DOI: 10.1109/ISCAS45731.2020.9180860, Oct. 12-14, 2020.

* cited by examiner

*Primary Examiner* — Ryan Johnson

(57) ABSTRACT

A low dropout regulator with fine loop preset including a coarse resolution regulator and a fine resolution regulator. The coarse resolution regulator adjusts a digital control value in response to an output transient to control a coarse output driver to regulate an output voltage with coarse resolution. The coarse resolution regulator eventually enters a limit-cycle oscillation mode with a corresponding duty cycle. The fine resolution regulator is disabled when the digital control value initially changes, is preset based on the duty cycle of the digital control value when in the limit-cycle oscillation mode, and is re-enabled after being preset to drive at least one fine output driver to regulate the output voltage with fine resolution. The preset provides a closer estimate of the supplemental current needed to meet the output load level when turned on after an output load transient to achieve less output ripple voltage.

20 Claims, 6 Drawing Sheets

| D_ON DUTY CYCLE | VPG[3:0] |
|---|---|
| <25% | 4b' 1111 |
| 25% ~ 45% | 4b' 1110 |
| 45% ~ 65% | 4b' 1100 |
| 65% ~ 85% | 4b' 1000 |
| >85% | 4b' 0000 |

FIG. 3

HYBRID LDO REGULATOR WITH FINE LOOP PRESET

BACKGROUND

Field

The present disclosure relates in general to low dropout (LDO) regulators, and more particularly to a hybrid LDO regulator with a fine loop preset to reduce output voltage overshoot or undershoot.

Description of the Related Art

Conventional hybrid low dropout (LDO) regulators including a coarse digital loop and a fine analog loop may be used to power digital loads in system-on-chip (SoC) configurations. Compared to a state-of-the-art analog LDO regulator, a hybrid LDO regulator can respond much more quickly to fast load transients by expending fewer resources, such as less area and current consumption. In systems with limited decoupling capacitance, only the fast coarse digital loop is switched on while the slow fine loop is switched off during output load transients, which can improve load transient performance. When the digital coarse loop enters into limited-cycle oscillation mode, the fine loop is turned on to improve the accuracy of the regulator output voltage. With this combination of fine and coarse loops, a hybrid LDO regulator can take the advantage of both the digital (coarse) and analog (fine) loops. Simply switching on the fine loop after a transient, however, may result in a large output voltage undershoot or overshoot voltage, which ultimately degrades the dynamic accuracy of the LDO regulator output, especially for configurations with small or no load capacitance.

BRIEF DESCRIPTION OF THE DRAWINGS

Embodiments of the present invention are illustrated by way of example and are not limited by the accompanying figures. Similar references in the figures may indicate similar elements. Elements in the figures are illustrated for simplicity and clarity and have not necessarily been drawn to scale.

FIG. 3 is a tabular diagram listing duty cycle ranges of D_ON and corresponding values of VPG for M=4 of the LDO regulator of FIG. 2 to illustrate margin used by the preset controller according to one embodiment.

DETAILED DESCRIPTION

The fine resolution loop of a hybrid LDO is preset according to the duty cycle of a digital control signal provided by the coarse resolution loop during a limit-cycle oscillation mode. In this manner, the fine loop can initially provide a closer estimate of the supplemental current needed to meet the output load level when turned on after an output load transient. The analog portion of the fine resolution loop then provides any final adjustment needed for the output load level. As a result, the hybrid LDO has less output ripple voltage during load transients. The solution described in the present disclosure is independent of the load capacitance, which not only varies across different process corners and temperatures, but also varies widely from application to application.

Figure 1:
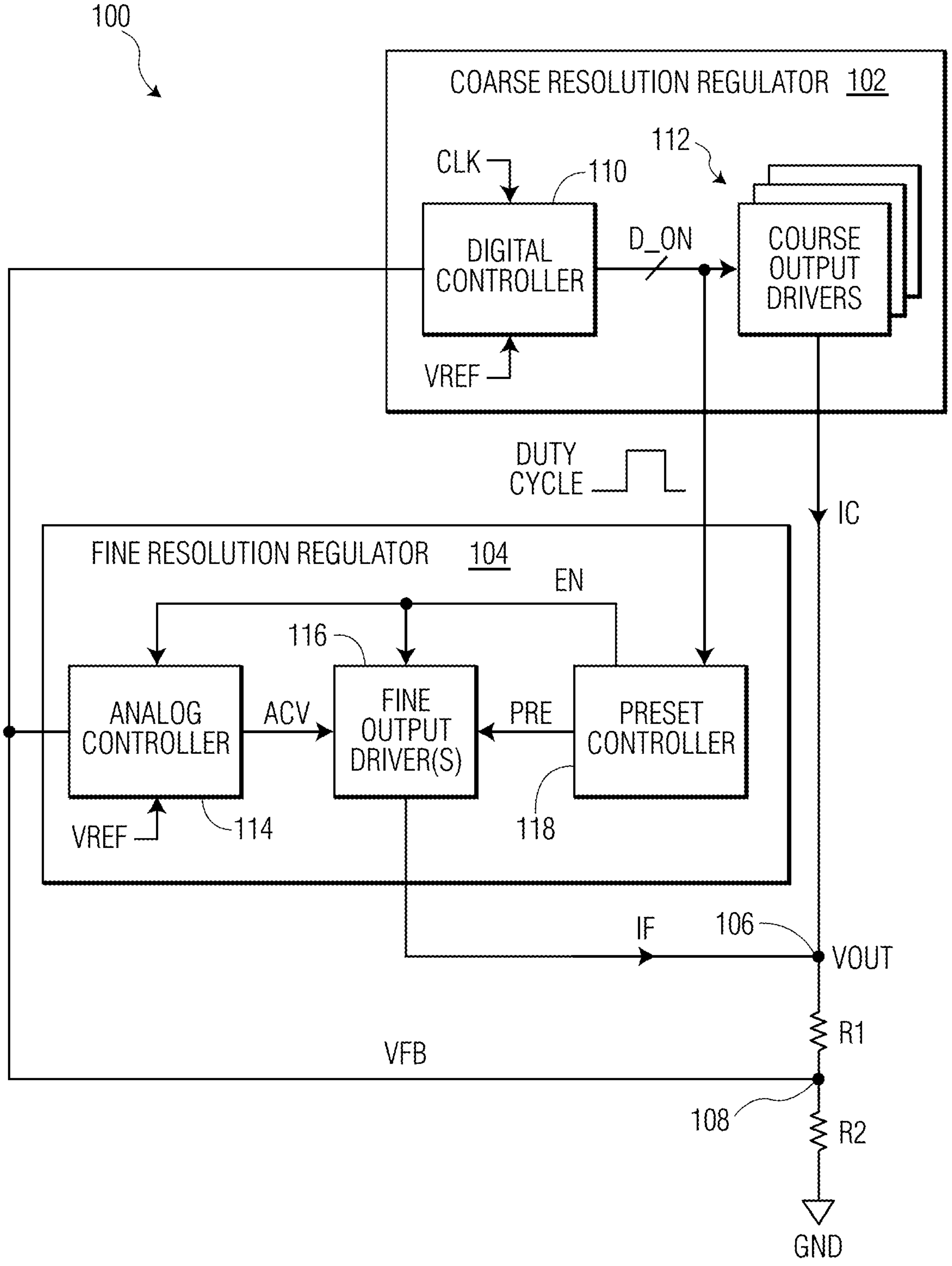
FIG. 1 is a simplified block diagram of a hybrid low dropout (LDO) regulator with fine loop preset implemented according to one embodiment.

FIG. 1 is a simplified block diagram of a hybrid low dropout (LDO) regulator 100 with fine loop preset implemented according to one embodiment. The LDO regulator 100 includes a coarse resolution regulator 102 providing a coarse output current IC and a fine resolution regulator 104 providing a fine output current IF to an output node 106 developing an output voltage VOUT. In one embodiment, VOUT has a predetermined fixed target voltage level for driving an output load (not shown) coupled to the output node 106. A pair of resistors R1 and R2 are coupled in series between the output node 106 and a voltage supply reference node, such as ground (GND). The resistors R1 and R2 have an intermediate feedback node 108 which develops a feedback voltage VFB based on a ratio of resistances of R1 and R2. VFB is provided to respective feedback inputs of the coarse resolution regulator 102 and the fine resolution regulator 104 to close both loops.

The coarse resolution regulator 102 includes a digital controller 110 that receives a clock signal CLK, a reference voltage VREF, and the feedback voltage VFB, and that outputs a digital control value D_ON to control activation of a number of a set of coarse output current drivers 112. The coarse output current drivers 112 include multiple drivers that each contribute a coarse unit level of current to IC when turned on by the digital controller 110 via D_ON. CLK has a sufficiently high frequency level to enable the coarse resolution regulator 102 to respond very quickly to output load transients between different load levels. VREF has a voltage level indicative of the target voltage level of VOUT, in which the resistance values of R1 and R2 are selected so that VFB should equal VREF when VOUT is at the predetermined target voltage level.

The fine resolution regulator 104 includes an analog controller 114 that receives VREF and VFB and that outputs an analog control value (ACV) to a fine output current driver 116 or, alternatively, to one of multiple fine output current drivers 116 (shown and described as fine output current driver(s) 116 intended to cover both cases). The fine output current driver(s) 116 generate the fine output current IF provided to the output node 106 to supplement the coarse output current IC to meet the output load level as further described herein. The fine resolution regulator 104 also includes a preset controller 118 that receives D_ON from the digital controller 110. The preset controller 118 outputs an enable signal EN to an enable input of the analog controller 114 to enable or disable the analog controller 114. The EN signal is also provided to the fine output current driver(s) 116 so that when the analog controller 114 is disabled, the fine output current driver(s) 116 are also turned off causing IF to drop to zero. In one embodiment, the preset controller 118 uses the EN signal to enable or disable remaining portions of the fine resolution regulator 204 other than the preset controller 218 itself, including disabling power transistors and the like. The preset controller 118 operates to preset the fine output current driver(s) 116 as represented by a PRE signal.

The digital controller 110 is configured to compare VFB with VREF and to respond quickly to load transients by turning on or turning off one or more of the coarse output current drivers 112 during each cycle of CLK to quickly adjust IC according to a new load level. The coarse resolution regulator 102, therefore, is able to respond quickly to load changes, but does not have the resolution accuracy to adjust IC to exactly meet each of the possible load levels. As an example, if the coarse output current drivers 112 include 8 coarse current drivers each providing 30 milliamperes (mA) of current, then the coarse output current drivers 112 can adjust IC from 0 mA to 240 mA in 30 mA increments. If the output load exhibits a load transient that changes from less than 30 mA to 200 mA, the fine resolution regulator 104 is turned off as further described herein, and the digital controller 110 detects a decrease of VFB and quickly turns on one or more coarse current drivers in successive CLK cycles to increase IC until VFB increases back to the level indicated by VREF. The digital controller 110, for example, may turn on 7 coarse current drivers to adjust IC to 210 mA to meet the new load level. Since 210 mA is too high, however, VFB rises above its target level so that the digital controller 110 turns off one of the coarse output current drivers 112 to decrease IC down to 180 mA, which is too low.

In the event that the output load is between the quantized coarse current levels of the coarse output current drivers 112, then eventually the digital controller 110 toggles D_ON between two different states (e.g., toggling activation of one of the coarse output drivers) in which the first state does not provide a sufficient amount of current whereas the second state provides too much current. In the example above, the digital controller 110 keeps 6 coarse current drivers turned on while it toggles one bit of D_ON to toggle activation (on and off) of a seventh coarse current driver in successive CLK cycles. The toggling of D_ON by the digital controller 110 between first and second states in which IC toggles between two current levels on either side of the actual load is referred to herein as a limit-cycle oscillation (LCO) mode of the coarse resolution regulator 102.

When the digital controller 110 reaches the LCO mode, the duty cycle of D_ON between the two states is about equal to the ratio of the difference between the actual load request and the low current output level of IC and the difference between the low and high output levels of IC provided by the coarse output current drivers 112. Thus, when the digital controller 110 enters the LCO mode in which it toggles one bit of D_ON to toggle activation of one coarse output driver thereby toggling IC between a low current level (LCL) and a high current level (HCL) on either side of an actual load level (LL), then the D_ON bit toggles at a duty cycle (DC) which may be estimated as DC≈(LL−LCL)/(HCL−LCL). In the example above, for LL=200 mA, LCL=180 mA, and HCL=210 mA, then DC=(200−180)/(210−180)=0.666, which represents a duty cycle of about 67% for the illustrated example. It is appreciated that IC may not actually drop to 180 mA nor actually rise to 210 mA during the LCO mode, but nonetheless the digital controller 110 oscillates D_ON with a duty cycle at about 67% to meet the load condition.

The preset controller 118 is configured to detect any change of D_ON indicative of a load transient, in which it responds by temporarily disabling operation of the fine resolution regulator 104. As shown, for example, the preset controller 118 de-asserts EN to disable the fine resolution regulator 104 including the analog controller 114 and to turn off the fine output driver(s) 116 so that IF goes to zero during an output load transient. Thus, the coarse resolution regulator 102 may quickly respond to the output load transient without contending with the fine resolution regulator 104. In one embodiment, the preset controller 118 is configured to detect the LCO mode of the coarse resolution regulator 102 by monitoring D_ON. As previously described, the LCO mode occurs when D_ON stabilizes so that only 1 bit of D_ON toggles at a stable duty cycle. In response to detection of the LCO mode, the preset controller 118 is further configured to measure or otherwise calculate the duty cycle of oscillation of D_ON (meaning, the duty cycle of the toggling bit). The preset controller 118 may be configured, for example, with a counter or timer and limited arithmetic logic to calculate the duty cycle. When the preset controller 118 determines the duty cycle, it presets the fine output driver(s) 116 based on the measured duty cycle of D_ON. The preset controller 118 then re-asserts the EN signal to re-enable the remaining portions of the fine resolution regulator 204 including the analog controller 114 and to release operation of the fine output driver(s) 116.

The collective output current of the fine output current driver(s) 116 is at least as large as one quantization level (coarse unit level of current) of the coarse output current drivers 112, so that the fine resolution regulator 104 is able to adjust IF with a sufficiently high resolution to supplement IC to meet the actual output load. Since the fine output driver(s) 116 are preset based on the duty cycle of D_ON, then when released by the preset controller 118, the level of IF quickly supplements the current level of IC to a level that is much closer to the actual load level. The re-enabled analog controller 114 then adjusts ACV to adjust IF to meet the actual load condition more accurately. When the digital controller 110 toggles D_ON to turn off the last coarse output driver to the lower IC level, the fine resolution regulator 104 adjusts IF to meet the actual load condition before the last coarse output driver is turned back on. The digital controller 110 detects the adjusted load condition via VFB and stops toggling D_ON. The collective current IC+IF provided by the coarse resolution regulator 102 and the fine resolution regulator 104 collectively meet the requested output load condition.

In summary of operation of the LDO regulator 100, in response to a load transient, the preset controller 118 quickly disables the fine resolution regulator 104 to allow the coarse resolution regulator 102 to respond to the new load as quickly as possible. The load transient may change in either direction, such as from a low load to a high load condition, or vice-versa. When the coarse resolution regulator 102 reaches the LCO mode, the preset controller 118 presets the fine output driver(s) 116 based on the duty cycle of D_ON, and then re-enables the fine resolution regulator 104 to supplement the output current with IF. An advantage of pre-setting the fine output driver(s) 116 of the fine resolution regulator 104 according to the duty cycle of the D_ON is to limit the under/overshoot voltage of the regulator output, which significantly improves the output dynamic accuracy of the LDO regulator 100.

As described further herein, the fine resolution regulator 104 may be implemented according to any one of different embodiments. In one embodiment, the fine output current driver(s) 116 includes multiple fine current drivers, in which the preset controller 118 controls and presets a subset of the multiple fine current drivers (e.g., all but one). The analog controller 114 controls the last fine current driver to make up the difference between the preset amount and the final output load level. In another embodiment, the fine output current driver(s) 116 only includes a single fine output current driver that is capable of providing any amount of current between 0 and a full quantization level or coarse unit level of current of the coarse output current drivers 112. The preset controller 118 is configured to directly preset ACV based on the measured duty cycle of D_ON, and then re-enable the analog controller 114 to more finely tune ACV based on the actual output load level.

Figure 2:
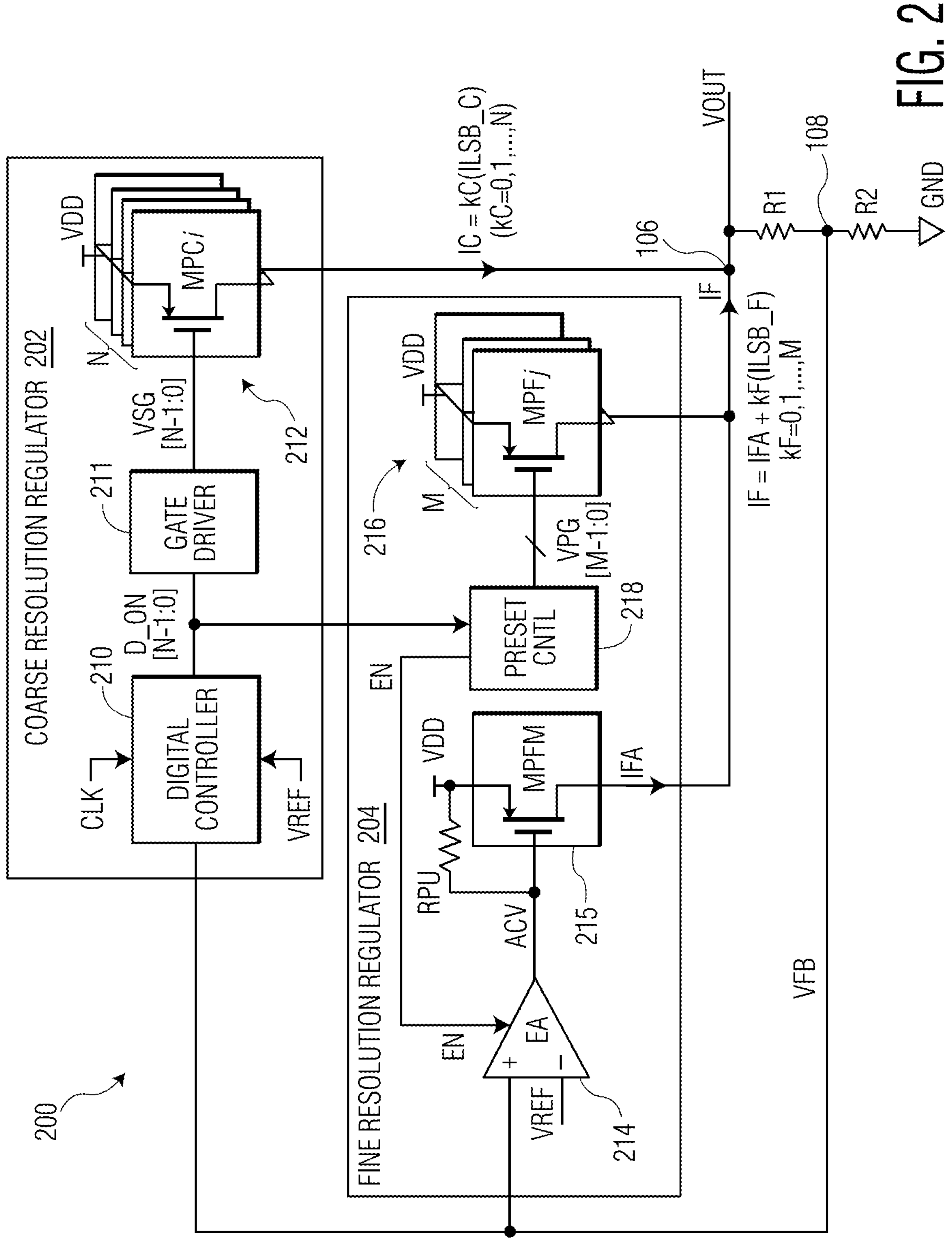
FIG. 2 is a more detailed block diagram of an LDO regulator with fine loop preset implemented according to one embodiment.

FIG. 2 is a more detailed block diagram of an LDO regulator 200 with fine loop preset implemented according to one embodiment. The LDO regulator 200 includes similar features as the LDO regulator 100 including a coarse resolution regulator 202 (implementing the coarse resolution regular 102) and a fine resolution regulator 204 (implementing the fine resolution regulator 104), both provided in corresponding control loops for providing a respective one of IC and IF for regulating VOUT developed on the output node 106. Again, the resistors R1 and R2 are coupled in series between the output node 106 and GND with the intermediate feedback node 108 developing VFB, which is provided to respective feedback inputs of the coarse resolution regulator 202 and the fine resolution regulator 204. As before. VOUT may be a predetermined fixed target voltage level for driving an output load (not shown) coupled to the output node 106.

The coarse resolution regulator 202 includes a digital controller 210 which is configured to operate in a similar manner as the digital controller 110. In a similar manner as previously described, the digital controller 210 receives CLK, VREF, and VFB, and outputs D_ON, which is shown as set of N digital control signals D_ON[N−1:0] provided to respective inputs of a gate driver 211. Again, CLK has a sufficiently high frequency for fast response to output load transients, VREF indicates the target voltage level of VOUT, and VFB indicates the actual voltage level of VOUT which is used for regulating VOUT to the target voltage level. The gate driver 211 converts each of the digital control signals D_ON[N−1:0] to a corresponding one of a set of gate drive voltages VSG [N−1:0] provided to a set of N coarse output current drivers 212 collectively providing IC.

In one embodiment, each of the coarse output current drivers 212 is configured as a P-type transistor device, such as an exemplary set of N P-channel MOS (PMOS) transistors MPCi each having a source terminal coupled to an upper supply voltage VDD, a drain terminal coupled to the output node 106, and a gate terminal receiving a corresponding one of the gate drive voltages VSG [N−1:0], in which “i” is an index from 0 to N−1. Each PMOS transistor MPCi has a size for driving a least significant bit (LSB) coarse current level ISLB_C that contributes to the course output current IC provided to the output node 106 when turned on by a corresponding one of the N gate drive voltages VSG [N−1:0]. The course output current IC is shown as IC=kC (ILSB_C) in which kC is a number from 0 to N identifying the number of the N coarse output current drivers 212 that are turned on by the gate driver 211.

The fine resolution regulator 204 includes an error amplifier (EA) 214 that is used to implement the analog controller 114. The EA 214 includes a negative input receiving VREF, a positive input receiving VFB, and an output providing the analog control value ACV. In this embodiment, ACV is provided to a control input of a single fine output current driver 215. The fine output current driver 215 may also be implemented as a PMOS transistor MPFM having a source terminal coupled to VDD, a drain terminal coupled to provide a current IFA to the output node 106, and a gate terminal receiving ACV. A pull-up resistor RPU is shown coupled between the output of EA 214 and VDD. The EA 214 also includes an enable input receiving an enable signal EN. When enabled, the EA 214 drives MPFM via ACV to adjust IFA in an attempt to equalize VFB and VREF. When disabled, the output of the EA 214 floats or is tri-stated so that ACV is pulled high to VDD through the resistor RPU to turn off MPFM so that IFA is zero (or a minimum current). RPU is shown as a resistor but may be implemented in alternative manner, such as a MOS switch or the like (not shown).

The fine resolution regulator 204 also includes a preset controller 218 that implements the preset controller 218 in the illustrated embodiment. The preset controller 218 receives D_ON in the form of the D_ON[N−1:0] signals and provides the enable signal EN used to enable or disable remaining portions of the fine resolution regulator 204 including the EA 214. The preset controller 218 also outputs a set of M gate drive voltages VPG[M−1:0] to control inputs of a set of M fine output current drivers 216. In one embodiment, each of the fine output current drivers 216 is configured as a set of M PMOS transistors MPFj, each having a source terminal coupled to VDD, a drain terminal coupled to the output node 106, and a gate terminal receiving a corresponding one of the gate drive voltages VPG[M−1:0], in which “j” is an index from 0 to M−1. In one embodiment, the preset controller 218 turns on any number of the M fine output current drivers 216 in a similar manner as the gate driver 211 turns on the coarse output current drivers 212. Each PMOS transistor MPFj has a size for driving a least significant bit (LSB) fine current level ISLB_F that contributes to the fine output current IF provided to the output node 106 when turned on by the preset controller 218. The fine output current IF is shown as IF=IFA+kF*ILSB_F, in which kF is a number from 0 to M identifying the number of the M fine output current drivers 216 that are turned on by the preset controller 218, and an asterisk “*” denotes multiplication.

In one embodiment, the maximum current output of the MPFM is about equal to each of the M fine output current drivers 216, so that the maximum output current level of IF≈(M+1) ILSB_F. In addition, ILSB_C≈(M+1) ILSB_F, which means that the current output of each of the coarse output current drivers 212 is about the same as the current capacity of all of the M fine output current drivers 216 and the fine output current driver 215 combined. Also, the current ILSB_C is selected such that the maximum expected output load current of the LDO regulator 200 is less than N*ILSB_C.

Operation of the LDO regulator 200 is now briefly described. The digital controller 210 responds quickly to a load transient by adjusting D_ON[N−1:0] to adjust IC in order to meet the new output load. The preset controller 218 detects the change of D_ON[N−1:0], and in response de-asserts EN to disable remaining portions of the fine resolution regulator 204 including the EA 214 and pulls each of the VPG[M−1:0] signals high to turn off any of the transistors MPFj that were on. When the EA 214 is disabled, RPU pulls ACV high to turn off MPFM. In this manner, IF drops to zero. Meanwhile, the digital controller 210 eventually reaches the LCO mode in which only one of the D_ON[N−1:0] signals is toggling at a relatively stable duty cycle. The preset controller 218 detects the LCO mode calculates the duty cycle of the toggling bit of D_ON[N−1:0], and applies a corresponding preset of the fine output current drivers 216. In one embodiment, the preset controller 218 controls the VPG[M−1:0] signals to turn on a number of the transistors MPFj of the fine output current drivers 216 to drive as much preset current kF (ISLB_F) as possible without exceeding the actual output load current when combined with IC. The preset controller 218 then asserts EN to re-enable the fine resolution regulator 204 including EA 214, so that the EA 214 drives MPFM via ACV to generate output current IFA to supplement the preset current with IFA to meet the actual output load current.

It is noted that since the preset controller 218 and the fine output drivers 216 are not in a control loop regulating VOUT, the preset controller 218 is configured with sufficient margin to prevent activation of too many of the transistors MPFj from being turned. If an excessive number of the fine output drivers 216 are turned on, then the preset current+IC overshoots the actual load current level so that the EA 214 may not be able to regulate VOUT. The preset controller 218 includes margin that prevents this condition as further described herein. An advantage of pre-setting the fine output drivers 216 of the fine resolution regulator 104 according to the duty cycle of the D_ON is to limit the under/overshoot voltage of the regulator output, which significantly improves the output dynamic accuracy of the LDO regulator 200.

FIG. 3 is a tabular diagram listing duty cycle ranges of D_ON and corresponding values of VPG[M−1:0] for M=4 of the LDO regulator 200 to illustrate margin used by the preset controller 218 according to one embodiment. A first column lists duty cycle ranges of D_ON in terms of percentage. The second column lists VPG[3:0] as corresponding 4-bit binary values (i.e., 4b'BBBB, in which "B" denotes the individual bits) indicating the number of the transistors MPFj that are turned on for the corresponding duty cycle. In one embodiment, ISLB_F is approximately equal to (1/(M+1)) ISLB_C, and MPFM can drive IFA to at least (1/M) ISLB_C, so that activation of all of the fine output drivers 216 and MPFM is at least equal to ILSB_C. In this manner, the fine resolution regulator 204 is able to generate IF by an amount that supplements IC by a sufficient amount for any expected output load level. For M=4, then the fine output drivers 216 includes four transistors MPF[3:0] each providing a current ISLB_F=(1/5)ILSB_C when turned on, for a total of (4/5)ILSB_C. The final $1/5^{th}$ is provided by MPFM generating IFA.

For M=4, then the coarse unit level of current represented by ILSB_C is subdivided into 5 ranges, 0 to 20%, 20% to 40%, 40% to 60%, 60% to 80%, and 80% to 100%. In this manner, each of the 4 transistors MPFj can contribute 20% of the additional current added to IC to meet the output load condition. The duty cycle of D_ON correlates with each of these ranges to inform the preset controller 218 the number of the fine output drivers 216 to turn on for a sufficient preset level. A duty cycle of 40%, for example, may correlate to activation of two of the transistors MPFj. The duty cycle measurement by the preset controller 218 may not be sufficiently accurate, however, such that if the duty cycle is actually only 39% but read as 40% by the preset controller 218, then the preset controller 218 may turn on two of the transistors MPFj when only one is needed. If so, then the resulting output current IC+IF is likely to overshoot the actual load amount causing erroneous operation. Such output current overshoot might not be properly absorbed by the load eventually causing an overcurrent condition.

The tabular diagram shown in FIG. 3 illustrates a 5% margin for M=4. Rather than a first range of up to 20%, the first range is up to 25%, or "<25%", in which none of the transistors MPFj are turned on in which VPG[3:0]=4b'1111. Rather than a second range of 20% to 40%, the second range is 25% to 45% in which only one of the transistors MPFj is turned on in which VPG[3:0]=4b'1110. Rather than a third range of 40% to 60%, the third range is 45% to 65% in which only two of the transistors MPFj are turned on in which VPG[3:0]=4b'1100. Rather than a fourth range of 60% to 80%, the fourth range is 65% to 85% in which only three of the transistors MPFj are turned on in which VPG [3:0]=4b' 1000. Rather than a fifth range of >80%, the fifth range is >85% in which all four of the transistors MPFj are turned on in which VPG[3:0]=4b'0000. It is noted that when the duty cycle is less than 25%, then the number of transistors MPFj (e.g., the number of fine current devices) that are turned on is zero.

It is noted that the EA 214 and the transistor MPFM of the fine output current driver 215 also has margin to drive more than $1/5^{th}$ ISLB_C, such as at least 20% more current. In this manner, the EA 214 is able to drive the transistor MPFM by an amount up to at least 40% of the coarse unit level of current represented by ILSB_C, so that the EA 214 driving MPFM ultimately controls the loop to meet the new output current level. If a subsequent load transient occurs causing the digital controller 210 to respond by adjusting D_ON, then the entire procedure is repeated to update operation of the LDO regulator 200.

Figure 4:
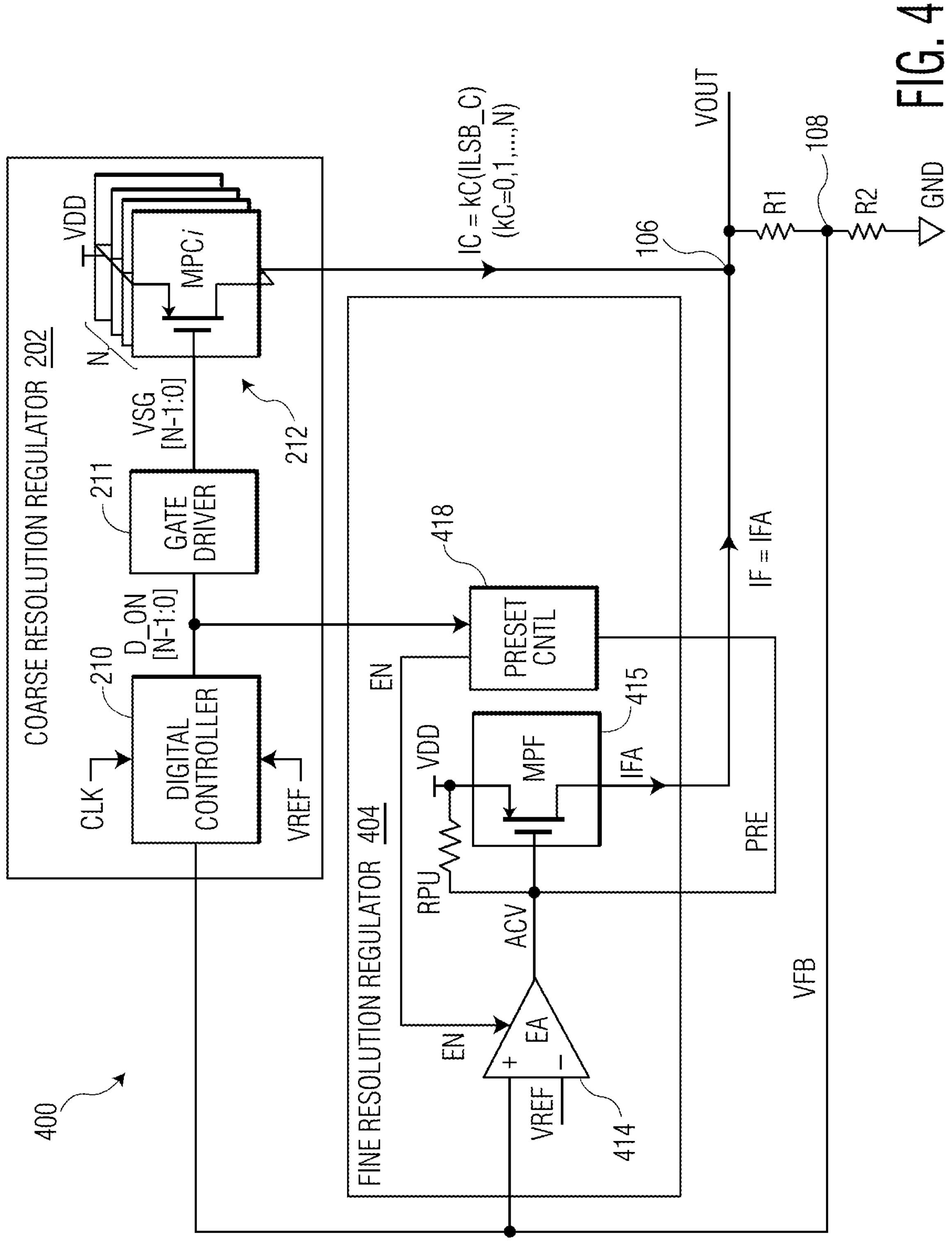
FIG. 4 is a more detailed block diagram of an LDO regulator with fine loop preset implemented according to another embodiment.

FIG. 4 is a more detailed block diagram of an LDO regulator 400 with fine loop preset implemented according to another embodiment. The LDO regulator 400 includes similar features as the LDO regulator 200 including the coarse resolution regulator 202 and a fine resolution regulator 404 (implementing the fine resolution regulator 104), both provided in corresponding control loops for providing a respective one of IC and IF to regulate VOUT developed on the output node 106. Again, the resistors R1 and R2 are coupled in series between the output node 106 and GND with the intermediate feedback node 108 developing VFB, which is provided to respective feedback inputs of the coarse resolution regulator 202 and the fine resolution regulator 204. As before, VOUT may be a predetermined fixed target voltage level for driving an output load (not shown) coupled to the output node 106.

In this case, the fine resolution regulator 204 is replaced by a fine resolution regulator 404. The fine resolution regulator 404 includes an error amplifier (EA) 414 which is substantially similar to the EA 214. The EA 414 includes a negative input receiving VREF, a positive input receiving VFB, and an output providing the analog control value ACV to a control input of a single fine output current driver 415. The fine output current driver 415 may also be implemented as a PMOS transistor MPF having a source terminal coupled to VDD, a drain terminal coupled to provide a current IFA to the output node 106, and a gate terminal receiving ACV. The pull-up resistor RPU (implemented as a resistor or a MOS switch or the like) is coupled between the output of EA 414 and VDD, and the EA 414 also includes an enable input receiving an enable signal EN.

The EA 414 and the fine output current driver 415 implemented by MPF are substantially similar in configuration and operation as the EA 214 and the fine output current driver 215 implemented by MPFM. A difference is that the fine output current driver 415 implemented by MPF is configured to drive IFA at least up to ILSB_C since the set of M fine output current drivers 216 of the fine resolution regulator 204 are eliminated.

The preset controller 218 is replaced by a preset controller 418, which also receives D_ON[N−1:0] from the coarse resolution regulator 202. The preset controller 418 operates in a similar manner in which it is configured to de-assert EN to disable remaining portions of the fine resolution regulator 404 (other than the present controller 418 itself) including the EA 414 upon detecting any change of D_ON[N−1:0] in response to a load transient. The preset controller 418 monitors D_ON[N−1:0] thereafter to detect when the digital controller 210 enters the LCO mode as previously described. When the LCO mode is detected, the preset controller 418 is configured to calculate the duty cycle of D_ON for determining a preset level. In this embodiment, the preset controller 418 is configured with a driver or the like that can preset IF by driving ACV via a preset drive signal PRE to a preset level before activating the EA 414. Once ACV is set to a preset level, the preset controller 418 re-asserts EN to re-enable the fine resolution regulator 404 and the EA 414 and then releases or open-circuits PRE to enable the EA 414 to take control of the loop and regulate VOUT by regulating IF based on the new load level.

In one embodiment, the preset controller 418 may have a set of predetermined preset voltage levels each based on corresponding duty cycle ranges similar to that shown by the tabular diagram of FIG. 3. The predetermined preset voltage levels may be determined by empirical analysis performed prior to operation. In another embodiment, the preset controller 418 converts the measured duty cycle to a corresponding preset value of ACV using a predetermined conversion algorithm or formula that may also be empirically determined before-hand. In any of these embodiments, an advantage of presetting ACV directly rather than using a separate set of fine output current drivers 216 is that the preset may be more accurate and may be closer to the actual final value. In addition, margin is less of an issue since the preset is allowed to overshoot by a small amount since the EA 414 operates to correct any preset discrepancy in either direction.

Figure 5:
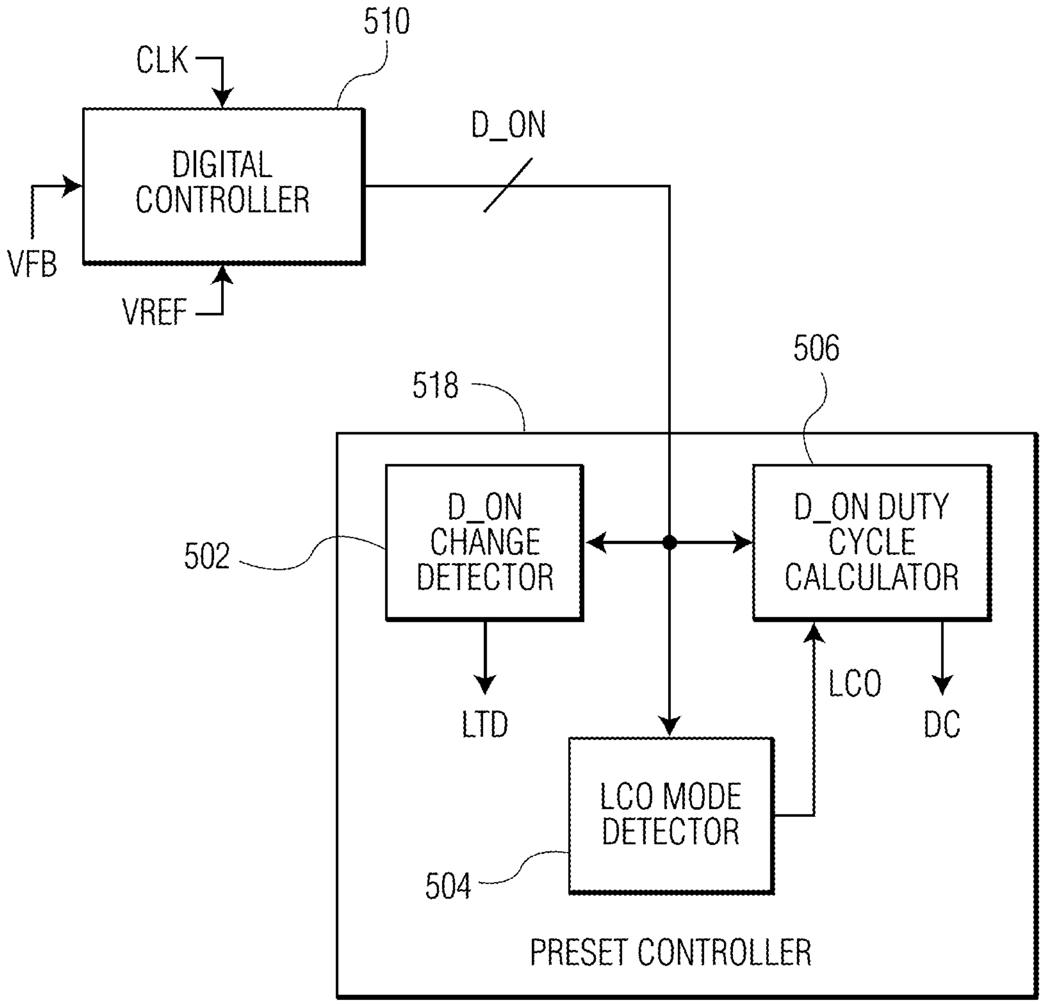
FIG. 5 is a simplified block diagram illustrating configurations of a digital controller and a preset controller implemented according to one embodiment.

FIG. 5 is a simplified block diagram illustrating configurations of a digital controller 510 and a preset controller 518 implemented according to one embodiment. The digital controller 510 is configured to operate in a substantially similar manner as the digital controller 110 or the digital controller 210 receiving CLK. VREF, and VFB and providing D_ON in a similar manner as previously described. The preset controller 518 is configured to operate in a substantially similar manner as any of the preset controllers 118, 218, or 418 previously described. In this case, the preset controller 518 includes a D_ON change detector 502 that monitors D_ON during steady state operation. When any change of D_ON occurs indicating a load transient, the D_ON change detector 502 asserts a load transient detect (LTD) signal and the preset controller disables the applicable fine resolution regulator (104, 204, 404) in the same manner previously described. The preset controller 518 also includes an LCO mode detector 504 that monitors D_ON to determine when the digital controller 510 enters the limit-cycle oscillation mode. When the LCO mode is detected, the LCO mode detector 504 asserts an LCO signal indicative thereof. The preset controller 518 further includes a D_ON duty cycle calculator 506 that receives the LCO signal. In response to receiving the LCO signal, the D_ON duty cycle calculator 506 calculates the duty cycle of D_ON in a similar manner previously described and provides a duty cycle (DC) value indicative thereof. Once the duty cycle of D_ON is determined, the preset controller 518 presets and enables the applicable fine resolution regulator (104, 204, 404) in the same manner previously described.

Figure 6:
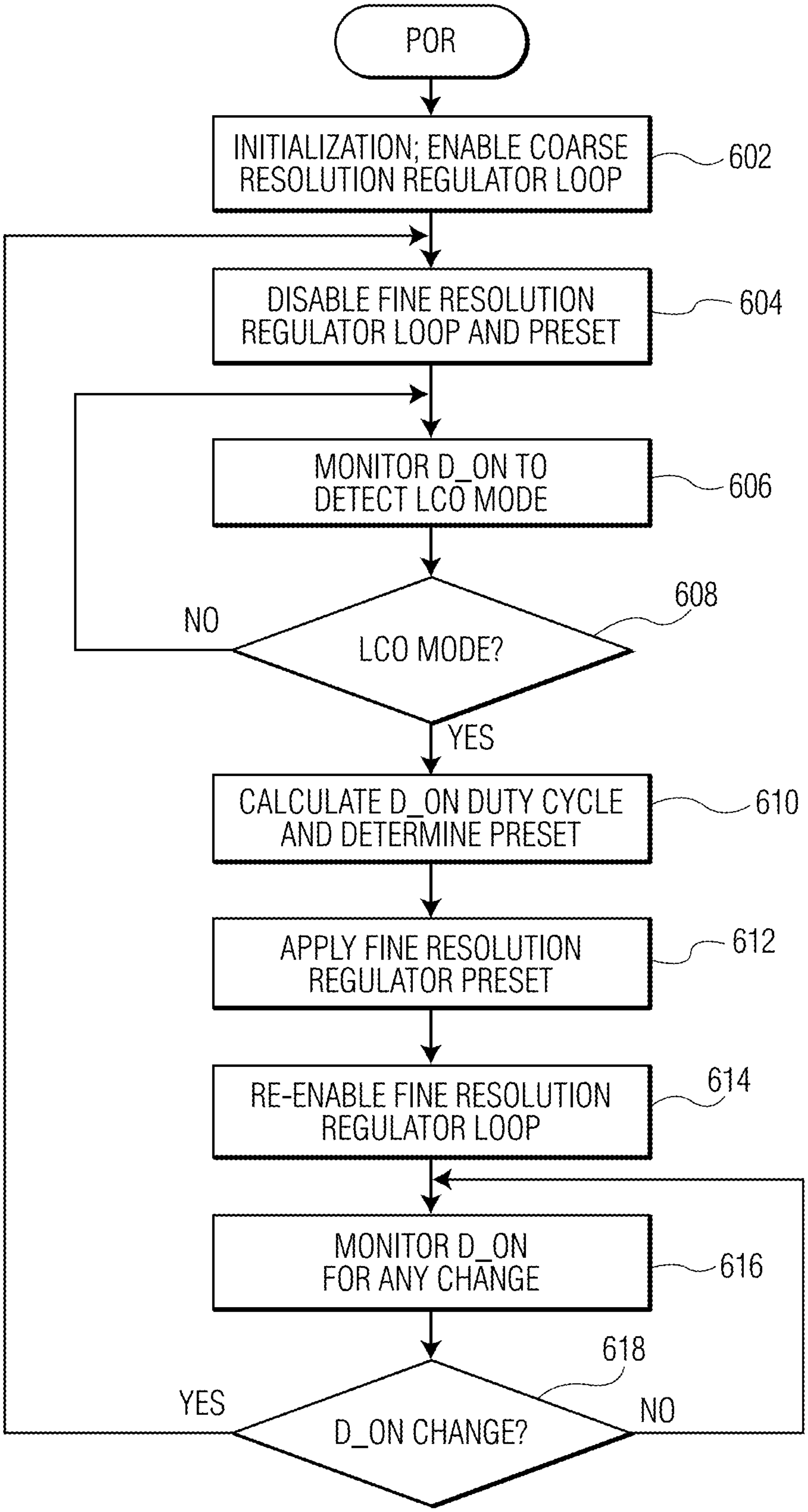
FIG. 6 is a flowchart diagram illustrating operation of a hybrid LDO regulator according to various embodiments.

FIG. 6 is a flowchart diagram illustrating operation of a hybrid LDO regulator according to various embodiments, including the LDO regulators 100, 200, and 400. Upon power-on, reset or restart (POR) operation advances to a first block 602 in which circuitry initialization is performed. In addition, the coarse resolution regulator loop is enabled to begin regulating the output voltage VOUT. In this manner, the digital controller of the applicable embodiment monitors and compares VFB with VREF and adjusts the corresponding digital control value D_ON accordingly. Operation advances to block 604 in which the fine resolution regulator loop and preset are disabled. For example, the applicable preset controller de-asserts the enable signal EN to disable the fine regulator loop including the corresponding error amplifier controlling the loop. For the LDO regulator 200, the preset controller 218 also asserts the VPG signals to turn off each of the fine output current drivers 216. In this manner, the fine current output from the fine resolution regulator is zero.

Operation advances to block 606, in which the preset controller monitors D_ON to detect the limit-cycle oscillation or LCO mode. As previously described, the LCO mode occurs when only 1 bit of D_ON toggles between two states with a relatively stable duty cycle. At next query block 608, if the LCO mode is not detected, operation loops back to block 606, and operation loops between blocks 606 and 608 while the coarse resolution regulator attempts to regulate VOUT. When the LCO mode is detected at block 608, operation advances instead to block 610 in which the duty cycle of D_ON (or the toggling bit) is calculated and the corresponding preset is determined. For the LDO regulator 200, for example, the preset controller 218 determines the number of the M fine output current drivers 216 to turn on without overshooting the applicable output load. As previously described, the preset controller 218 may include margin as illustrated in FIG. 3 for M=4. For the LDO regulator 400, the preset controller 418 determines the value of ACV sufficient to apply the applicable preset.

At next block 612, the applicable preset controller applies the fine resolution regulator preset, such as driving VPG [M−1:0] to the determined preset amount or by driving ACV to the determined voltage level. At next block 614, the applicable preset controller enables the fine resolution regulator loop, such as by re-asserting the enable signal to enable the loop including the corresponding error amplifier and power transistors to begin fine loop regulation. It is noted that the preset application and enabling the analog error amplifier (e.g., fine resolution regulator loop) may be performed at about the same time. At next block 616, the applicable preset controller then monitors D_ON for any change indicating an output load transient. If no change of D_ON is detected as determined at next query block 618, operation loops back to block 616. Operation loops between blocks 616 and 618 while operation is stabilized without any load transients. Upon detecting a change of D_ON at block 618, operation loops instead back to block 604 to disable the fine resolution regulator loop and preset once again as previously described.

Operation loops between blocks 604 and 618 to respond to any load transients during operation. After POR and initialization and upon reaching steady state operation in response to an initial load, operation loops between blocks 616 and 618. When a change of D_ON occurs, the fine resolution loop and preset is disabled (block 604), D_ON is monitored to detect the LCO mode (blocks 606 and 608), the duty cycle of D_ON is calculated and the preset determined upon detection of the LCO mode (block 610), the preset is applied to the fine resolution regulator (block 612), the fine loop resolution regulator is re-enabled (block 614), and operation returns to looping between blocks 616 and 618 during steady state operation.

In any of the embodiments described and those embodiments in accordance with that described herein, the fine resolution loop of a hybrid LDO is preset according to the duty cycle of a digital control signal provided by the coarse resolution loop during a limit-cycle oscillation mode. In this manner, the fine loop can initially provide a closer estimate of the supplemental current needed to meet the output load level when turned on after an output load transient. The analog portion of the fine resolution loop then provides any final adjustment needed for the output load level. As a result, the hybrid LDO has less output ripple voltage during loop transients. The solution described in the present disclosure is independent of the load capacitance, which not only varies across different process corners and temperatures, but also varies widely from application to application.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. For example, variations of positive circuitry or negative circuitry may be used in various embodiments in which the present invention is not limited to specific circuitry polarities, device types or voltage or error levels or the like. For example, circuitry states, such as circuitry low and circuitry high may be reversed depending upon whether the pin or signal is implemented in positive or negative circuitry or the like. In some cases, the circuitry state may be programmable in which the circuitry state may be reversed for a given circuitry function.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A low dropout regulator, comprising:
- a coarse resolution regulator, comprising:
  - a coarse output driver coupled to an output node that develops an output voltage, wherein the coarse output driver is configured to be controlled by a digital control value; and
  - a digital controller that is configured to adjust the digital control value in response to an output transient to regulate the output voltage with coarse resolution, wherein the digital controller is configured to enter a limit-cycle oscillation mode by toggling the digital control value at a corresponding duty cycle; and
- a fine resolution regulator, comprising:
  - a fine output driver receiving an analog control value and coupled to the output node;
  - an analog controller that is configured to adjust the analog control value to regulate the output voltage with fine resolution; and
  - a preset controller that is configured to disable the fine resolution regulator when the digital control value changes in response to an output transient, that is configured to calculate the duty cycle of the digital control value during the limit-cycle oscillation mode, and that is configured to preset the fine output driver based on the calculated duty cycle and to re-enable the fine resolution regulator.

2. The low dropout regulator of claim 1, wherein the coarse resolution regulator comprises:
- the coarse output driver comprising:
  - a plurality of coarse current devices, each having current terminals coupled between a source voltage and the output node and each having a control input; and
  - a gate driver coupled to the control input of each of the plurality of coarse current devices, wherein the gate driver is configured to turn on a number of the plurality of coarse current devices based on the digital control value; and
- wherein the digital controller is configured to adjust the digital control value based on a detected level of the output voltage.

3. The low dropout regulator of claim 2, wherein the digital controller is configured to enter the limit-cycle oscillation mode by toggling only one bit of the digital control value at the duty cycle while the detected level of the output voltage has not achieved a reference level, and that is configured to stop toggling the digital control value when the detected level has achieved the reference level.

4. The low dropout regulator of claim 1, wherein the fine resolution regulator comprises:
- the fine output driver comprising a first fine current device having current terminals coupled between the source voltage and the output node and having a control input;
- the analog controller comprising an error amplifier having an input receiving a feedback voltage indicative of the output voltage and having an output providing the analog control value to the control input of the first fine current device; and
- preset circuitry, comprising:
  - the fine output driver further comprising a plurality of second fine current devices, each having current terminals coupled between the source voltage and the output node and each having a control input; and
  - the preset controller having an input receiving the digital control value and having an output coupled to the control input of each of the plurality of second fine current devices.

5. The low dropout regulator of claim 4, wherein the preset controller is configured to disable the error amplifier and to turn off the plurality of second fine current devices when the digital control value changes in response to an output transient, to turn on a number of the plurality of second fine current devices based on the calculated duty cycle of the digital control value during the limit-cycle mode to preset the fine resolution regulator, and then to re-enable the error amplifier.

6. The low dropout regulator of claim 5, wherein the preset controller is configured with margin in which the number of the plurality of second fine current devices that are turned on based on the calculated duty cycle is determined to avoid exceeding a reference level of the output voltage.

7. The low dropout regulator of claim 4, wherein the preset controller comprises:

a change detector that can provide a load change indication in response to a change of the digital control value;

a limit-cycle oscillation mode detector that can monitor the digital control value to detect the limit-cycle oscillation mode and that can provide a limit-cycle oscillation mode signal indicative thereof; and a duty cycle calculator that can calculate the duty cycle of the digital control value in response to the limit-cycle oscillation mode signal and that can provide a duty cycle value indicative thereof;

wherein the preset controller is configured to disable remaining portions of the fine resolution regulator including turning off the plurality of second fine current devices and disabling the error amplifier in response to the load change indication, to set a preset level by turning on a number of the plurality of fine current devices based on the duty cycle value, and to re-enable the remaining portions of the fine resolution regulator including the error amplifier.

8. The low dropout regulator of claim 1, wherein the fine resolution regulator comprises:

the fine output driver comprising a fine current device having current terminals coupled between the source voltage and the output node and having a control input;

the analog controller comprising an error amplifier having an input receiving a feedback voltage indicative of the output voltage and having an output providing the analog control value to the control input of the fine current device; and the preset controller having an input receiving the digital control value and having an output coupled to the control input of the fine current device.

9. The low dropout regulator of claim 8, wherein the preset controller is configured to disable the error amplifier when the digital control value changes in response to an output transient, to drive the analog control value to a preset level based on the calculated duty cycle of the digital control value, and then to re-enable the error amplifier.

10. The low dropout regulator of claim 8, wherein the preset controller comprises:

a change detector that can provide a load change indication in response to a change of the digital control value;

a limit-cycle oscillation mode detector that can monitor the digital control value to detect the limit-cycle oscillation mode and that can provide a limit-cycle oscillation mode signal indicative thereof;

a duty cycle calculator that can calculate the duty cycle of the digital control value in response to the limit-cycle oscillation mode signal and that can provide a duty cycle value indicative thereof; and wherein the preset controller is configured to disable remaining portions of the fine resolution regulator including the error amplifier in response to the load change indication, to drive the analog control value to a preset level based on the duty cycle of the digital control value, and to release the analog control value and re-enable remaining portions of the fine resolution regulator including the error amplifier.

11. A method of operating a low dropout regulator that includes a coarse resolution regulator and a fine resolution regulator, comprising:

adjusting a digital control value in response to an output transient to control a coarse output driver to regulate an output voltage on an output node with coarse resolution;

disabling the fine resolution regulator upon detecting the digital control value being adjusted;

detecting when the digital control value indicates limit-cycle oscillation mode in which the digital control value toggles with a corresponding duty cycle;

calculating the duty cycle of the digital control value during the limit-cycle oscillation mode;

presetting the fine resolution regulator based on the calculated duty cycle; and re-enabling the fine resolution regulator after presetting the fine resolution regulator to drive at least one fine output driver to regulate the output voltage with fine resolution.

12. The method of claim 11, further comprising:

comparing a detected level of the output voltage with a reference level;

the adjusting comprising entering the limit-cycle oscillation mode by toggling only one bit of the digital control value at the duty cycle while the detected level of the output voltage has not achieved the reference level; and stopping toggling of the digital control value when the detected level has achieved the reference level.

13. The method of claim 11, wherein the disabling the fine resolution regulator comprises:

disabling an error amplifier that drives a first fine current device coupled to the output node; and turning off a plurality of second fine current devices coupled to the output node that are used for presetting the fine resolution regulator.

14. The method of claim 13, wherein the presetting the fine resolution regulator comprises turning on a number of the plurality of second fine current devices based on the calculated duty cycle of the digital control value during the limit-cycle mode.

15. The method of claim 14, further comprising determining the number of the plurality of second fine current devices turned on for presetting the fine resolution regulator with sufficient margin to avoid overshooting a reference level of the output voltage.

16. The method of claim 11, wherein the disabling the fine resolution regulator comprises disabling an error amplifier that provides an analog control voltage to drive a fine current device coupled to the output node.

17. The method of claim 16, wherein the presetting the fine resolution regulator comprises presetting the analog control voltage to a preset level based on the calculated duty cycle of the digital control value.

18. The method of claim 16, wherein the re-enabling the fine resolution regulator comprises re-enabling the error amplifier to adjust the analog control voltage to regulate the output voltage with fine resolution.

19. A low dropout regulator, comprising:

a coarse resolution regulator that is configured to adjust a digital control value in response to an output transient to control a coarse output driver to regulate an output voltage on an output node with coarse resolution, wherein the coarse resolution regulator is configured to enter a limit-cycle oscillation mode when the digital control value toggles with a corresponding duty cycle; and a fine resolution regulator that is configured to be disabled when the digital control value changes in response to the output transition, that is configured to be preset based on the duty cycle of the digital control value, and that is configured to be re-enabled after being preset to drive at least one fine output driver to regulate the output voltage with fine resolution.

20. The low dropout regulator of claim 19, wherein the fine resolution regulator is configured to be preset to a level that is as close as possible to a reference level of the output voltage without overshooting the reference level.

* * * * *